US012762339B2

(12) United States Patent
Poroor

(10) Patent No.: US 12,762,339 B2
(45) Date of Patent: Oct. 13, 2026

(54) DERIVING MEANINGS OF WORDS IN A FIRST LANGUAGE FROM MORPHOLOGY OF SYNONYMS IN A SECOND LANGUAGE

(71) Applicant: Zoho Corporation Private Limited, Kanchipuram District (IN)

(72) Inventor: Jayaraj Poroor, Kerala (IN)

(73) Assignee: Zoho Corporation Private Limited, Kanchipuram District (IN)

( * ) Notice: Subject to any disclaimer, the term of this patent is extended or adjusted under 35 U.S.C. 154(b) by 155 days.

(21) Appl. No.: 18/528,907

(22) Filed: Dec. 5, 2023

(65) Prior Publication Data

US 2024/0202439 A1 Jun. 20, 2024

Related U.S. Application Data

(60) Provisional application No. 63/433,381, filed on Dec. 16, 2022.

(51) Int. Cl.
*G06F 40/247* (2020.01)
*G06F 40/268* (2020.01)
*G06F 40/40* (2020.01)

(52) U.S. Cl.
CPC .......... *G06F 40/247* (2020.01); *G06F 40/268* (2020.01)

(58) Field of Classification Search
CPC ........ G06F 40/247; G06F 40/30; G06F 40/35; G06F 40/40; G06F 40/51; G06F 40/53; G06F 40/58; G06F 40/268

(Continued)

(56) References Cited

U.S. PATENT DOCUMENTS 4,703,425 A * 10/1987 Muraki ................. G06F 40/247 704/7
6,385,568 B1 * 5/2002 Brandon ............... G06F 40/247 704/7

(Continued)

FOREIGN PATENT DOCUMENTS

CA 2100956 C * 1/1999 ........... G06F 40/216
EP 0241717 A2 * 10/1987 ........... G06F 40/247

OTHER PUBLICATIONS

Avinash, "Introducing Pratyay", Vedanta Today, https://vedantatoday.com/pratyay-introduction/, downloaded Oct. 3, 2025, 13 Pages. (Year: 2025).*

(Continued)

*Primary Examiner* — Martin Lerner
(74) *Attorney, Agent, or Firm* — Silicon Edge Law Group LLP; Arthur J. Behiel

(57) ABSTRACT

A semantic analyzer uses the morphological semantics of Sanskrit to extract numerical representations, or embeddings, from English words. The analyzer finds Sanskrit synonyms for the English input word and deconstructs them into their constituent Dhatus, or morphological units, using Sanskrit morphological rules known as Pratyayas. The meanings of the Dhatus are then used to disambiguate the meaning of the input word. These Dhatu constituents describe the semantic attributes of the word's denotation, forming an embedding of the input word. This low-dimensional vector representation of the word's meaning can be used for various tasks requiring natural language understanding. The Dhatu vectors define a logic of natural-language words, capturing specific semantic attributes to support semantic models with improved interpretability and reasoning power.

16 Claims, 8 Drawing Sheets

(58) Field of Classification Search
USPC .................................. 704/1, 2, 4, 5, 8, 9, 10
See application file for complete search history.

(56) References Cited

U.S. PATENT DOCUMENTS

| | | | | |
|---|---|---|---|---|
| 6,735,583 | B1 * | 5/2004 | Bjarnestam | G06F 16/40 |
| 8,214,199 | B2 * | 7/2012 | Anismovich | G06F 40/55 704/277 |
| 8,374,844 | B2 | 2/2013 | Brun et al. | |
| 8,515,731 | B1 * | 8/2013 | Ramirez Robredo | G06F 40/247 704/2 |
| 8,527,262 | B2 | 9/2013 | Kambhatla et al. | |
| 8,712,758 | B2 | 4/2014 | Crouch et al. | |
| 9,400,781 | B1 * | 7/2016 | Navratil | G06F 40/253 |
| 9,779,085 | B2 | 10/2017 | Wick et al. | |
| 10,803,252 | B2 | 10/2020 | Chatterjee et al. | |
| 11,507,746 | B2 | 11/2022 | Okura et al. | |
| 11,645,447 | B2 | 5/2023 | Yerebakan | |
| 2008/0040095 | A1 * | 2/2008 | Sinha | G06F 40/45 704/2 |
| 2009/0157380 | A1 * | 6/2009 | Kim | G06F 40/53 704/4 |
| 2009/0175545 | A1 * | 7/2009 | Cancedda | G06F 40/268 382/229 |
| 2013/0275118 | A1 * | 10/2013 | DeNero | G06F 40/45 704/3 |
| 2014/0082003 | A1 | 3/2014 | Feldman et al. | |
| 2016/0132487 | A1 * | 5/2016 | Nauze | G06F 40/40 704/4 |
| 2017/0011289 | A1 * | 1/2017 | Gao | G06F 40/268 |
| 2018/0018317 | A1 * | 1/2018 | Cheng | G06F 40/30 |
| 2018/0166077 | A1 * | 6/2018 | Yamaguchi | G06F 40/30 |
| 2018/0232363 | A1 * | 8/2018 | Jin | G06F 40/247 |
| 2019/0095433 | A1 * | 3/2019 | Lee | G06F 40/247 |
| 2019/0171718 | A1 * | 6/2019 | Ishikawa | G06F 40/247 |
| 2021/0124803 | A1 * | 4/2021 | Alloh | G06F 40/247 |
| 2022/0027397 | A1 * | 1/2022 | Morimoto | G06F 40/247 |
| 2022/0309248 | A1 * | 9/2022 | Liu | G06F 40/40 |
| 2024/0143924 | A1 * | 5/2024 | Pfante | G06F 40/247 |

OTHER PUBLICATIONS

Bhate, Saroja, and Subhash Kak. "Panini's Grammar and Computer Science." Annals of the Bhandarkar Oriental Research Institute, vol. 72, 1991, pp. 79-94. 19 pages.

Kulkarni, Malhar, et al. "Introducing Sanskrit Wordnet," Global Wordnet Conference, GWC 2010, Year 2010. 8 pages.

Wikipedia. "Natural Language Processing." retrieved from https://en.wikipedia.org/w/index.php?title=Natural_language_processing&oldid=1109224621, last edited on Sep. 8, 2022. 12 pages.

Wikipedia. "Sanskrit." retrieved from https://en.wikipedia.org/w/index.php?title=Sanskrit&oldid=1110562290, last edited on Sep. 16, 2022. 62 pages.

Wikipedia. "Word Embedding." retrieved from https://en.wikipedia.org/w/index.php?title=Word_embedding&oldid=1168588273, last edited on Aug. 3, 2023. 8 pages.

Wikipedia. "Word2vec." retrieved from https://en.wikipedia.org/w/index.php?title=Word2vec&oldid=1167430879, last edited on Jul. 27, 2023. 8 pages.

Yogawiki, "Sanskrit Verbal Roots List With English Translation." wiki.yoga-vidya.de/Sanskrit_Verbal_Roots_List_with_English_Translation, Feb. 24, 2015. 55 pages.

* cited by examiner

DERIVING MEANINGS OF WORDS IN A FIRST LANGUAGE FROM MORPHOLOGY OF SYNONYMS IN A SECOND LANGUAGE

TECHNICAL FIELD

Embodiments of the present disclosure are related to natural language processing (NLP).

BACKGROUND

Humans are very good at extracting meaning from natural languages. Language comprehension has proven difficult for machines, however, due to the extraordinary complexity and subjectivity of human communication. Semantic Analysis is a branch of Natural Language Processing (NLP) that addresses this difficulty by applying computation to context, logical structure, and grammar.

NLP represents either non-contextual or contextual word meanings as vectors called "embeddings." For example, the word "cat" might be represented as [0.2, 0.5, 0.1, 0.9, 0.1], where each number in the vector is a feature that encodes some aspect of the word's semantics or syntax. The cat vector might describe features such as the part of speech (noun or verb), the gender (male or female), the meaning (pet or wild animal), the size (small or large), or the color (black, white, or gray). The word "dog" might be represented as a dog vector with similar features. The words dog and cat could then be distinguished by comparing the features of the dog and cat vectors. For example, the dog vector might have a higher value for the gender feature (male) or the meaning feature (pet), whereas the cat vector might have a higher value for the size feature (small) or the color feature (gray).

NLP word embeddings are typically learned using a neural network. The neural network is trained on a dataset of text—a corpus—and is tasked with predicting the most likely meaning of a word given its context. During training, the neural network learns to encode the semantic and syntactic features of words into vector embeddings, which can then be used as an input to other NLP models and algorithms. Most words have multiple, context-dependent meanings. This complexity makes it difficult for a neural network to accurately capture all features of a word in a context, and thus to generate a word embedding that accurately reflects the word's meaning.

BRIEF DESCRIPTION OF DRAWINGS

The subject matter presented herein is illustrated by way of example and not by way of limitation in the figures of the accompanying drawings, in which like reference numerals refer to similar elements and in which.

DETAILED DESCRIPTION

A semantic analyzer extracts numerical representations—embeddings—from words expressed in an input language, such as English, by leveraging the morphological semantics of Sanskrit. Given an input English word, the analyzer looks up one or more Sanskrit synonyms. Sanskrit words are constructed by applying morphological rules, called Pratyayas, to morphological units called Dhatus. The analyzer inverts the logic of the Pratyayas to deconstruct each of the Sanskrit synonyms into its constituent Dhatu or Dhatus. The meanings of the Dhatus, and thus the meaning of input word, are then disambiguated contextually. The method performed by the semantic analyzer can be termed "language-morphology-based lexical semantic extraction." "Language morphology" refers to the structure and formation of words, and "lexical semantics" to the meanings of individual words and the relationships between them. "Extraction" refers to the process of identifying and retrieving those meanings.

The Dhatu constituent(s) of an input English word describe some of the semantic attributes of the word's denotation, which gives a general idea of the word's meaning. This idea is used to form an embedding of the input word, a low-dimensional vector representation of the meaning of the word in context. Embeddings can be used for various tasks requiring natural language understanding (NLU), such as natural-language query processing, extracting relationships or associations between entities mentioned in text (relation extraction), and measuring the similarity between texts or documents (similarity checking).

Sanskrit words are represented in their equivalent International Alphabet of Sanskrit Transliteration (IAST) form throughout this document. For instance, one of the Sanskrit synonyms for "teach" is "pathayathi", which is formed by applying a Pratyaya (morphological rule) named "nich" to the Dhatu "path". Thus, "pathayathi" is equivalent to the nich "path". The Pratyaya "nich" also acts as a semantic function where the meaning of the Dhatu (X) is transformed as "make someone perform X". For example, the meaning of "path" Dhatu is "to read'. Therefore, the lexical semantics of the word "pathayathi" becomes "make someone read".

Dhatu word meanings are represented as interpretable vectors, the dimensions of which are independent and meaningful. Moreover, the Dhatu vectors define a logic of natural-language words using element-wise operations on these vectors. This logic helps to capture specific semantic attributes represented by the Dhatus in support of semantic models with improved interpretability and reasoning power.

Sparse and Low-Dimensional, Dhatu-Based Semantic Vector Representation

Figure 1:
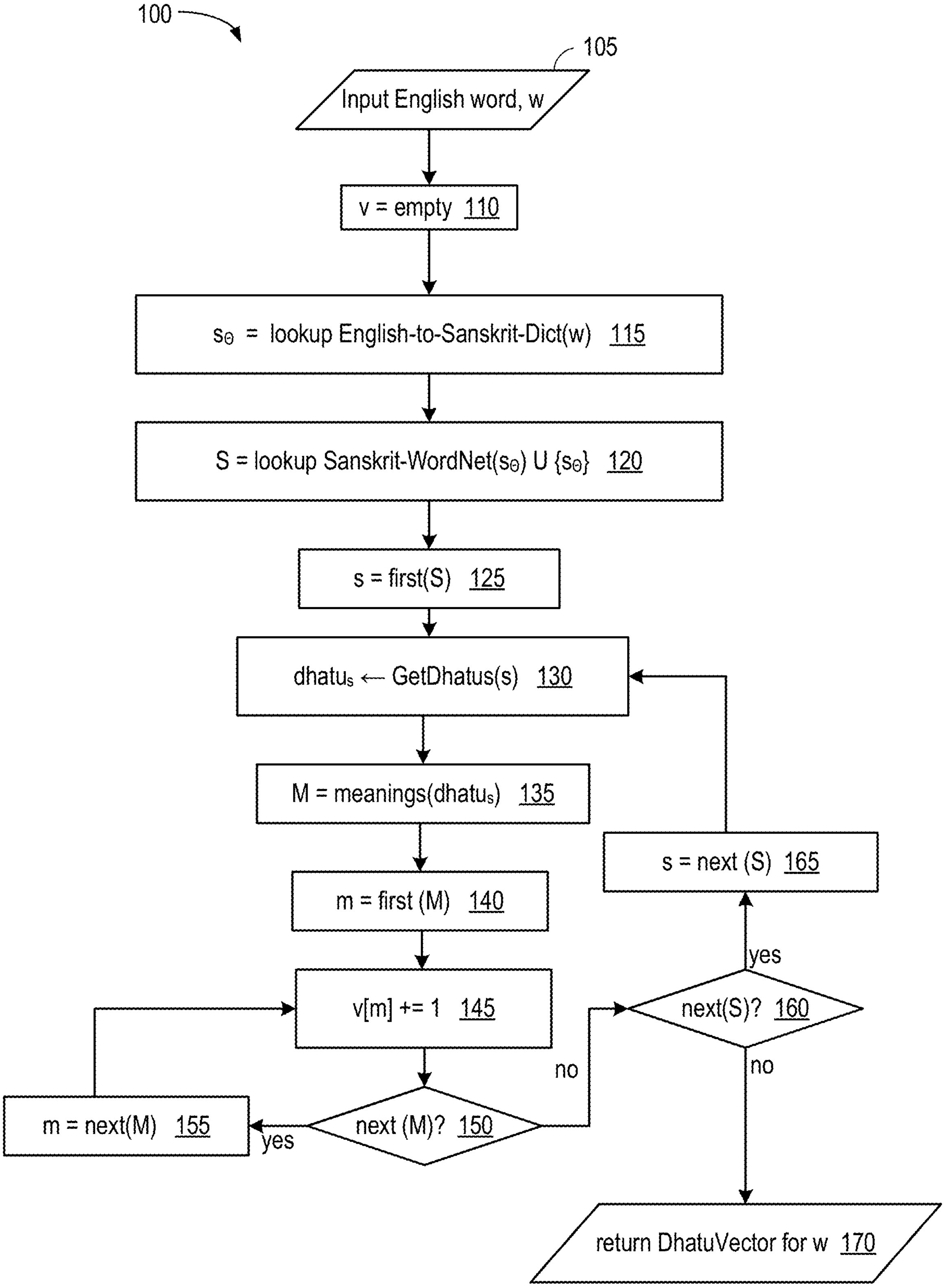
FIG. 1 is a flowchart 100 illustrating a process for capturing significant semantic attributes of an English word w (105) as a sparse and low-dimensional Dhatu vector DhatuVector.

FIG. 1 is a flowchart 100 illustrating a process for capturing significant semantic attributes of an English word w (105) as a sparse and low-dimensional Dhatu vector DhatuVector. A vector v is initialized to zero (step 110) and an equivalent primary Sanskrit word (so) is obtained for word w from an English-to-Sanskrit dictionary (115). The next step 120 employs Sanskrit-WordNet, a lexical database with a network of words and their relationships in the Sanskrit language. A set of Sanskrit synonyms is collected for so, with the union of so and its synonyms represented as a set of synonyms S (120).

Starting with the first synonym s in set S (125), a function GetDhatus(s) is called to deconstruct the synonym into one or more Dhatus $dhatu_s$ (130). A set of meanings M is then extracted from Dhatus set $dhatu_s$ (135). A Dhatu can have more than one meaning, so the number of elements of set M is greater than or equal to the number of elements in set dhatus. Step 135 can be carried out using either a Morphological Rule-Based Dhatu Discovery or a Score-Based Dhatu Discovery Approach, embodiments of which are detailed below.

The next sequence of steps counts the number of instances of each meaning m within the set of meanings M. For the first meaning m (140), a value v[m] increments (145). Per decision 150 and step 155, this incrementing continues until there are no more meanings in set M at which time value v[m] is the number of meanings for the first Sanskrit synonym s from step 125. Per decision 160 and step 165, the process returns to step 130 if synonym set S has one or more synonyms left to consider. If not, the process returns vector DhatuVector (170), which represents the lexical semantics of English word w in the Dhatu space.

Dhatu vector DhatuVector for English word w is a N-dimensional vector with Dhatu-meanings (m) as its dimensions. Meanings M is the total number of distinct Dhatu-meanings, equivalent to the dimensions of vector DhatuVector. The value of a given dimension represents the strength of the Dhatu meaning associated with that dimension. In this embodiment, the strength of a Dhatu meaning m in vector DhatuVector for English word w is the number of occurrences of that meaning in set M.

Morphological Rule-Based Dhatu Discovery

Figure 2:
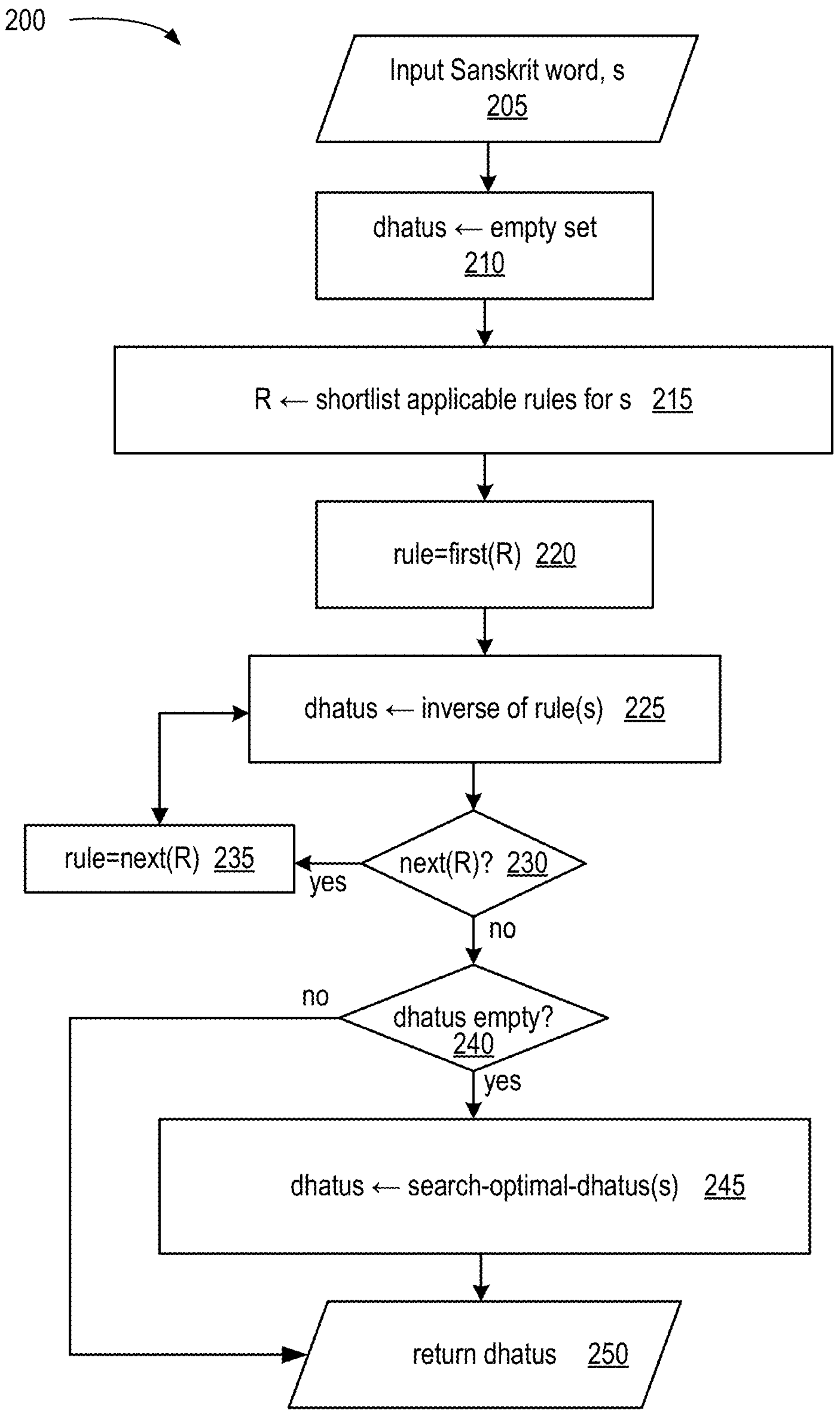
FIG. 2 is a flowchart 200 illustrating an embodiment of a morphological rule-based approach to discovering Dhatus for a Sanskrit synonym s, an element of a set S (205).

FIG. 2 is a flowchart 200 illustrating an embodiment of a morphological rule-based approach to discovering Dhatus for a Sanskrit synonym s, an element of a set S (205). In Sanskrit grammar, a Pratyaya is a suffix or an affix that is added to the root or stem of a word to convey various grammatical functions, changes in meaning, or modifications of the word. A set dhatus is initialized empty (210) and a set R of applicable Pratyayas, acting as morphological rules, is shortlisted for the given synonym s to remove irrelevant or redundant data to simplify the data set (215).

Next, beginning with the rule R (220), a Dhatu or Dhatus is obtained by inverting the Pratyaya (225), such as by applying the inverse morphological rule of Pratyaya nich to "pathayathi" to obtain the Dhatu "path". Per decision 230 and step 235, this inverse application of rules continues for each element in the set of rules R. Then, per decision 240, if the set of Dhatus is not empty, then the process returns the dhatus (250). If the set is empty, the process initiates a search for Dhatus (245). The set of Dhatus dhatus can be empty if none is realized from the inverse operation of step 225. For example, a Sanskrit term s from set S is a noun that is not supported by Sanskrit Grammar rules.

Score-Based Dhatu Discovery Approach

Figure 3:
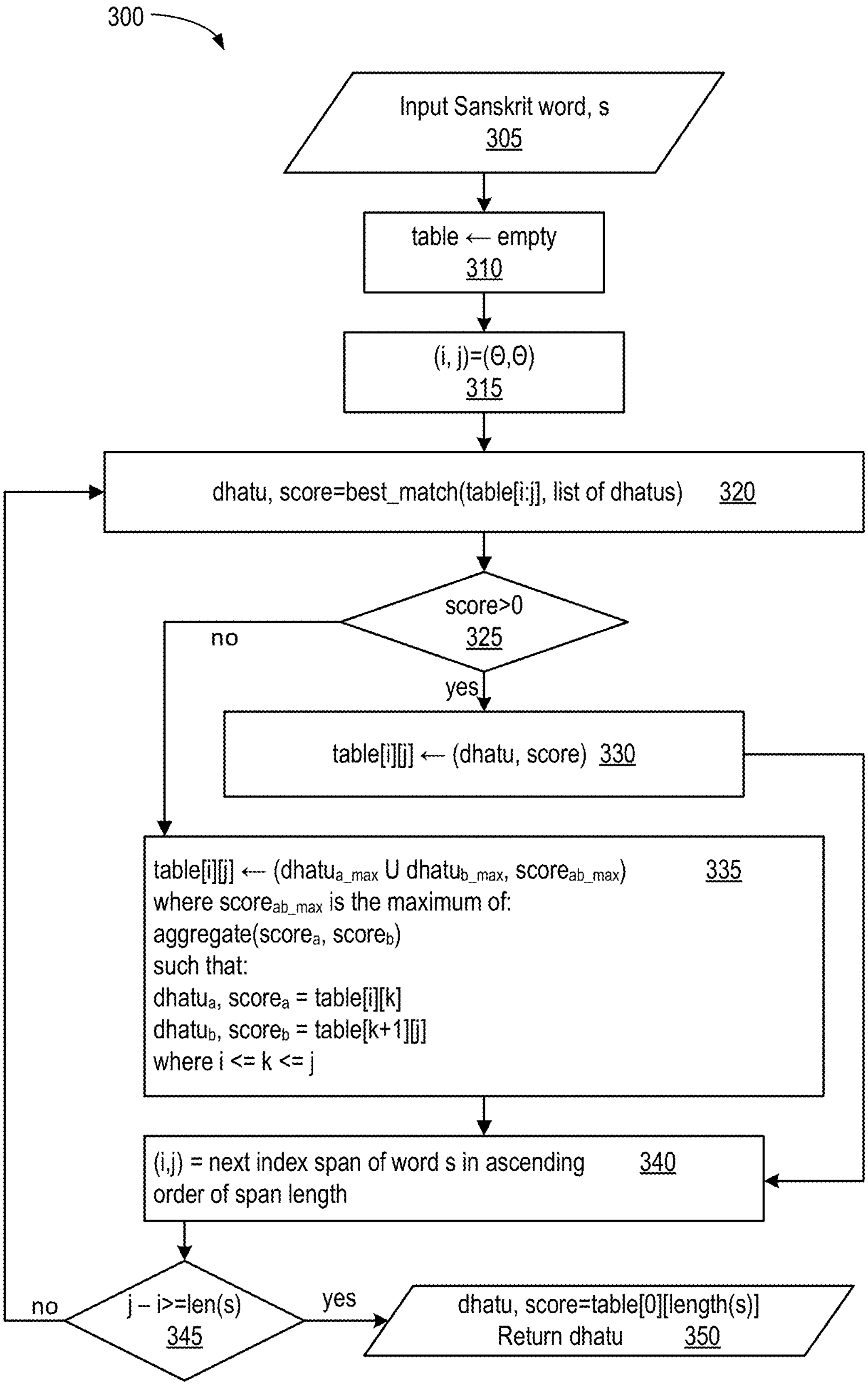
FIG. 3 is a flowchart 300 depicting a score-based approach to finding Dhatus from a Sanskrit word s (305), an approach that can be used with or as an alternative to looking up Dhatus in a dictionary.

FIG. 3 is a flowchart 300 depicting a score-based approach to finding Dhatus from a Sanskrit word s (305), an approach that can be used with or as an alternative to looking up Dhatus in a dictionary. An empty table is created and represented as a set of empty cells (i,j) arranged in rows i and columns j (310). The table is then populated with all possible left-to-right combinations of character spans (tokens) for the word (315).

Some Sanskrit words are converted to an internal simplified IAST form before tabulation. Take, for example, the Sanskrit word whose IAST representation is "prapathati". In this representation: th⇒T, so the word representation becomes "prapaTati". This simplification is done so that each Sanskrit character occupies only one character position. Using "prapaTati" as an example, Table 1 below shows an empty table is created and represented as a set of empty cells (i,j) arranged in rows i and columns j (310). The table is then populated with all possible left-to-right combinations of character spans (tokens) for the word. a matrix[i][j] constructed to represent substrings of the word from character index i till character index j (inclusive).

The matrix of Table 1 is k by k, where k is the length of Sanskrit word s (k=9 in the prapaTati example). In step 315, each cell value table[i][j] is populated with the possible tokens table[i][k] and table[k+1][j], where i denotes the first character of the token, j denotes the last character of the token and k lies between i and j (i<k<j).

TABLE 1

| Offset | 0 | 1 | 2 | 3 | 4 | 5 | 6 | 7 | 8 |
|---|---|---|---|---|---|---|---|---|---|
| 0 | p | pr | pra | prap | prapa | prapaT | prapaTa | prapaTat | prapaTati |
| 1 | | r | ra | rap | rapa | rapaT | rapaTa | rapaTat | rapaTati |
| 2 | | | a | ap | apa | apaT | apaTa | apaTat | apaTati |
| 3 | | | | p | pa | paT | paTa | paTat | paTati |
| 4 | | | | | a | aT | aTa | aTat | aTati |
| 5 | | | | | | T | Ta | Tat | Tati |
| 6 | | | | | | | a | at | at |
| 7 | | | | | | | | t | ti |
| 8 | | | | | | | | | i |

The process then runs a dynamic, programming-based Dhatu detection algorithm on the matrix of Table 1. In step 320, the character string in a cell table[i:j] is matched against a list of dhatus. Matches are scored as the square of the number of characters in the matching dhatus (e.g., a matching dhatu "paT" is a three-character string, and thus scores a nine). Per decision 325, if the score for a given cell table [i][j] is greater than zero, the cell is updated to include the matching dhatu and the associated score (330). In Table 1, cell table[3][5] with dhatu "paT" is updated to include a score of nine. If the score for a given cell table is zero, decision 325 passes the cell to step 335 in which the cell is updated with the best match, if any, and a score for the match.

In step 335, the cell table[i][j] under consideration is filled with a pair: a union of some sets 'dhatua_max' and 'dhatub_max', and a value 'scoreab_max', where scoreab_max is the maximum of: aggregate(scorea, scoreb). The value 'scoreab_max' is the maximum result from aggregating values: 'scorea' and 'scoreb'. The aggregate function could be e.g. a sum. The entries dhatua, scorea are set to table[i][k] and dhatub, scoreb to table[k+1][j], where i<=k<=j. All possible 'k' values between 'i' and 'j' (inclusive of 'i' and exclusive of 'j') are considered in finding the aggregate scores. The value 'scoreab_max' for the cell under consideration is updated to an aggregate score if the aggregate score is higher than a current maximum. The scores are thus used to select dhatus from the dhatus for the substrings such that the score of the combination is maximized.

Whatever the score, either from step 330 or 335, the cell index is updated (340). Per decision 345, the process returns to step 320 if there are more cells for consideration. Otherwise, the process issues a message 350 reporting the dhatu discovered for the input Sanskrit word s.

Table 2, below, cells that do not have a computed dhatu are marked with '-'. Table 2 illustrates how a matching dhatu "patT" propagates to all cells for which the cell is a substring. The propagation path for dhatu paT is marked with arrows, following a direct match of dhatu "paT" in cell[3][5] after the first round of propagation for cells [i][5] for i from 5 down to 0.

TABLE 2

| Offset | 0 | 1 | 2 | 3 | 4 | 5 | 6 | 7 | 8 |
|---|---|---|---|---|---|---|---|---|---|
| 0 | — | — | — | — | — | paT | | | |
| 1 | | — | — | — | — | ↑<br>paT | | | |
| 2 | | | — | — | — | ↑<br>paT | | | |
| 3 | | | | — | — | ↑<br>paT | | | |
| 4 | | | | | — | — | — | — | — |
| 5 | | | | | | — | — | — | — |
| 6 | | | | | | | — | — | — |
| 7 | | | | | | | | — | — |
| 8 | | | | | | | | | — |

Table 3, below, shows the results of a second round of propagation for cells [i][6] for i from 6 down to 0.

TABLE 3

| Offset | 0 | 1 | 2 | 3 | 4 | 5 | 6 | 7 | 8 |
|---|---|---|---|---|---|---|---|---|---|
| 0 | — | — | — | — | — | paT→ | paT | | |
| 1 | | — | — | — | — | ↑<br>paT→ | paT | | |
| 2 | | | — | — | — | ↑<br>paT→ | paT | | |
| 3 | | | | — | — | ↑<br>paT<br>→ | paT | | |
| 4 | | | | | — | — | — | — | — |
| 5 | | | | | | — | — | — | — |
| 6 | | | | | | | — | — | — |
| 7 | | | | | | | | — | — |
| 8 | | | | | | | | | — |

Table 4, below, shows the results of a third round of propagation for cells [i][7] for i from 7 down to 0.

TABLE 4

| Offset | 0 | 1 | 2 | 3 | 4 | 5 | 6 | 7 | 8 |
|---|---|---|---|---|---|---|---|---|---|
| 0 | — | — | — | — | — | paT→ | paT→ | paT | |
| 1 | | — | — | — | — | ↑<br>paT→ | paT→ | paT | |
| 2 | | | — | — | — | ↑<br>paT→ | paT→ | paT | |
| 3 | | | | — | — | ↑<br>paT<br>→ | paT<br>→ | paT | |
| 4 | | | | | — | — | — | — | — |
| 5 | | | | | | — | — | — | — |
| 6 | | | | | | | — | — | — |
| 7 | | | | | | | | — | — |
| 8 | | | | | | | | | — |

Table 5, below, shows the results of a fourth round of propagation for cells [i][8] for i from 8 down to 0. The dhatu content for cell[0][8] is the dhatu set discovered for the entire string and is marked in italics. The score for the dhatu match of "paT" is nine for all cells that contain it. The score is nine, the square of the number of characters in the dhatu match.

TABLE 5

| Offset | 0 | 1 | 2 | 3 | 4 | 5 | 6 | 7 | 8 |
|---|---|---|---|---|---|---|---|---|---|
| 0 | — | — | — | — | — | paT→ | paT→ | paT→ | paT |
| 1 | | — | — | — | — | ↑<br>paT→ | paT→ | paT→ | paT |
| 2 | | | — | — | — | ↑<br>paT→ | paT→ | paT→ | paT |
| 3 | | | | — | — | ↑<br>paT<br>→ | paT<br>→ | paT→ | paT |
| 4 | | | | | — | — | — | — | — |
| 5 | | | | | | — | — | — | — |
| 6 | | | | | | | — | — | — |
| 7 | | | | | | | | — | — |
| 8 | | | | | | | | | — |

DhatuNet

Figure 4:
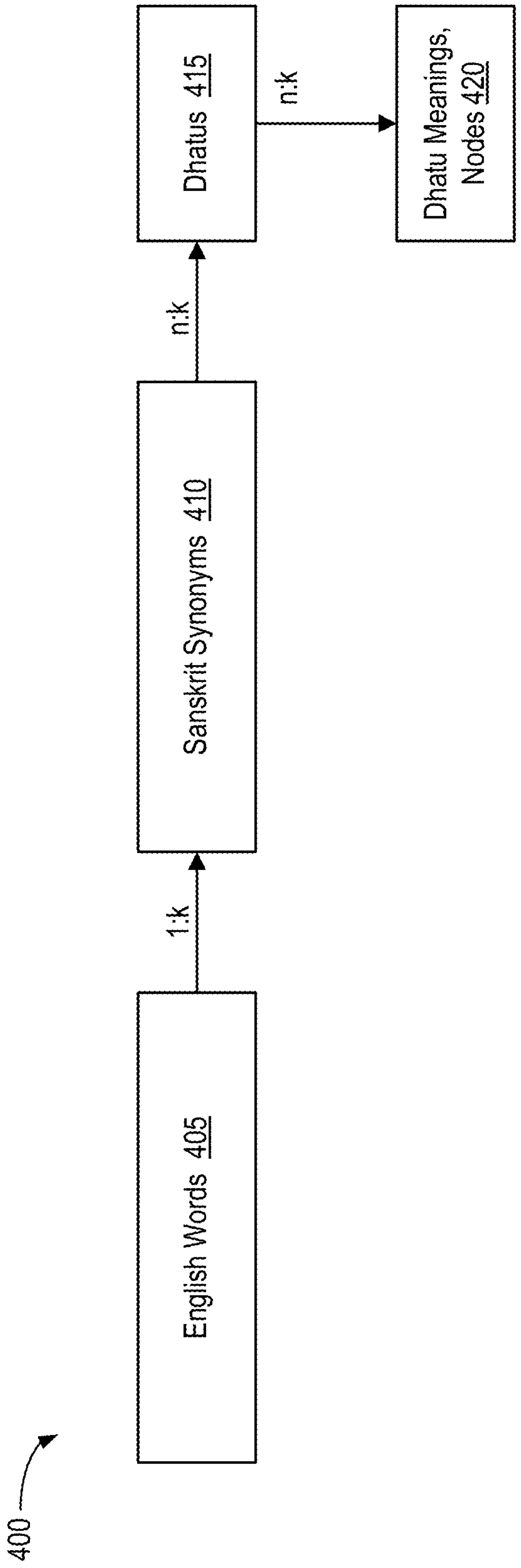
FIG. 4 is a diagram 400 representing a structure of a DhatuNet, a directed acyclic graph used in some embodiments to represent the meanings of English words.

FIG. 4 is a diagram 400 representing a structure of a DhatuNet, a directed acyclic graph used in some embodiments to represent the meanings of English words. Nodes 405 and 410 represent a relationship between English words and their Sanskrit synonyms, and nodes 410 and 415 a relationship between the Sanskrit synonyms and their constituent Dhatus. Relationships between nodes are labeled using a scheme where "l", "n" and "k" denote the cardinality of the nodes. For example, "l:k" between nodes 405 and 410 denotes one-to-many relationships, whereas "n:k" between nodes 410 and 415 and between Dhatus nodes 415 and meanings nodes 420 specify many-to-many relationships. The values of n and k need not be the same between disparate nodes.

Figure 5:
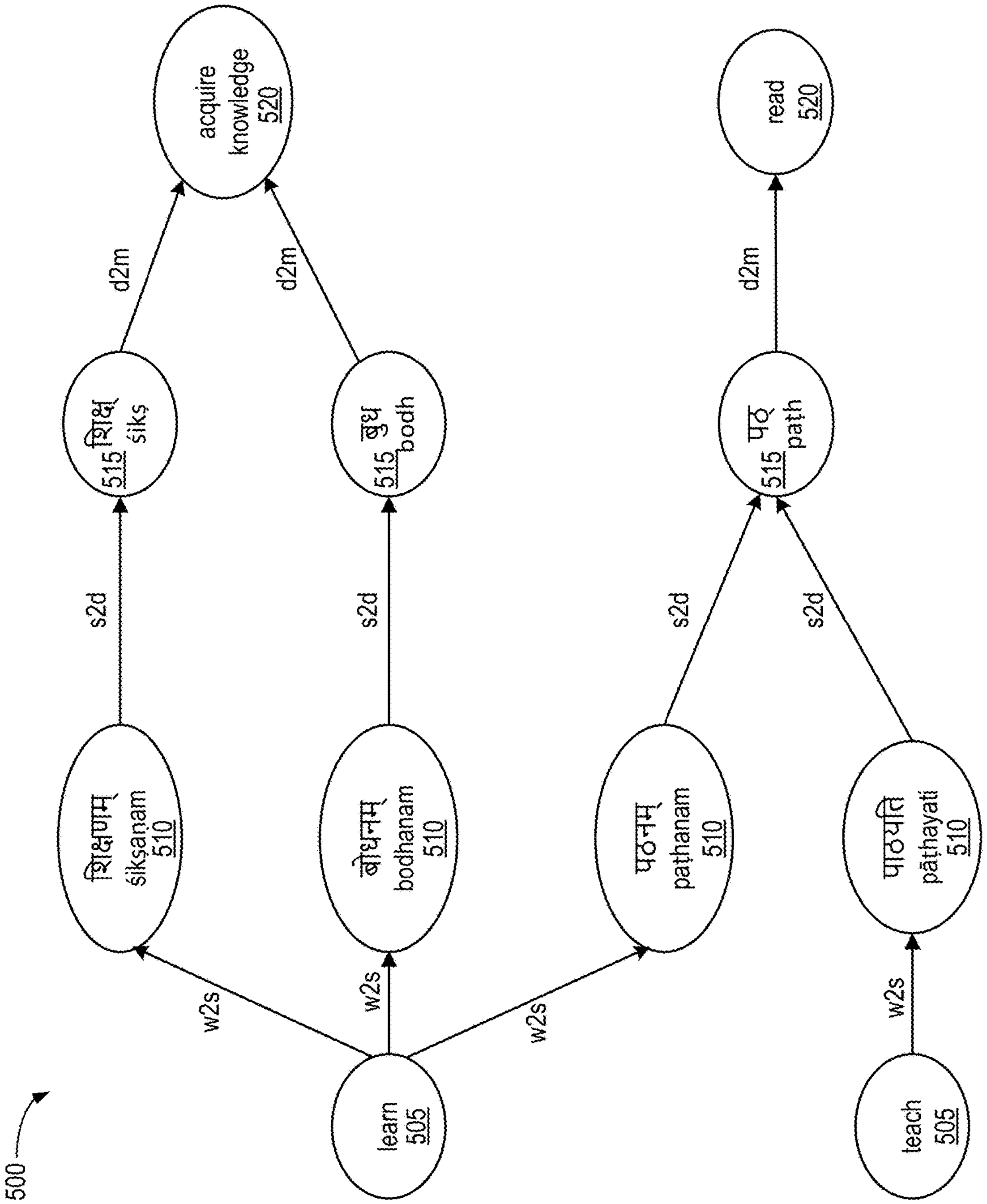
FIG. 5 depicts a sample fragment of a DhatuNet graph 500 that relates English words to English meanings using Sanskrit synonyms and Dhatus.

FIG. 5 depicts a sample fragment of a DhatuNet graph 500 that relates English words to English meanings using Sanskrit synonyms and Dhatus. Sanskrit text is written with equivalent IAST representations. The edges of graph 500 from English word nodes 505 to Sanskrit synonym nodes 510 are labelled as 'w2s' for "word-to-synonym." For example, 'w2s' edge connects the English word "teach" to its corresponding Sanskrit synonym " "पाठयति"". The edges from Sanskrit synonym nodes 510 to Dhatu nodes 515 are labelled as 's2d' for "synonym-to-Dhatu." For example, 's2d' edge connects the Sanskrit synonym "पाठयति" with its corresponding Dhatu " "पठ्".". Finally, the edges from Dhatu nodes 515 to Dhatu-Meaning nodes 520 are labelled as 'd2m' for "Dhatu-to-meaning." For example, 'd2m' edge connects the Dhatu ""पठ्"" to its corresponding Dhatu-meaning "read". Meanings 510 are used to create embeddings for NLP algorithms, embeddings with reduced ambiguity over the English words from which they are derived.

With reference to node 505 at upper left, English word "learn" yields Sanskrit synonyms śikṣaṇam,, bodhanam, and pathanam. paṭhanam. Śikṣaṇam is derived from the Dhatu "śikṣ" (शिक्ष्) and represents the act of teaching (śikṣaṇ) or the lesson that is taught (śikṣaṇam) in the accusative case. Bodhanam is derived from the Dhatu "bodh" (बोध्), which means "to know" or "to understand." The "नम्" (nam) suffix is used to form a noun from the root, indicating the act of the verb. So, "bodhanam" represents "the act of instructing" or "teaching." Pathanam is derived from the Dhatu "path" (पठ्), which means "to read" or "to study." Pathanam is the form of the word with the "नम्" (nam) suffix. Like "bodhanam," the nam suffix forms a noun from the Dhatu, representing the act of the verb. So, "pathanam" means "the act of reading" or "study." With reference to node 505 at lower left, the English word "teach" yields Sanskrit synonym pāṭhayati. Pāṭhayati, like pathanam, is derived from the Dhatu "path," to read or study. Adding the suffix "yati" (यति) indicates the third person singular form of the verb in the present tense, which means "he/she/it reads" or "he/she/it studies."

Figure 6:
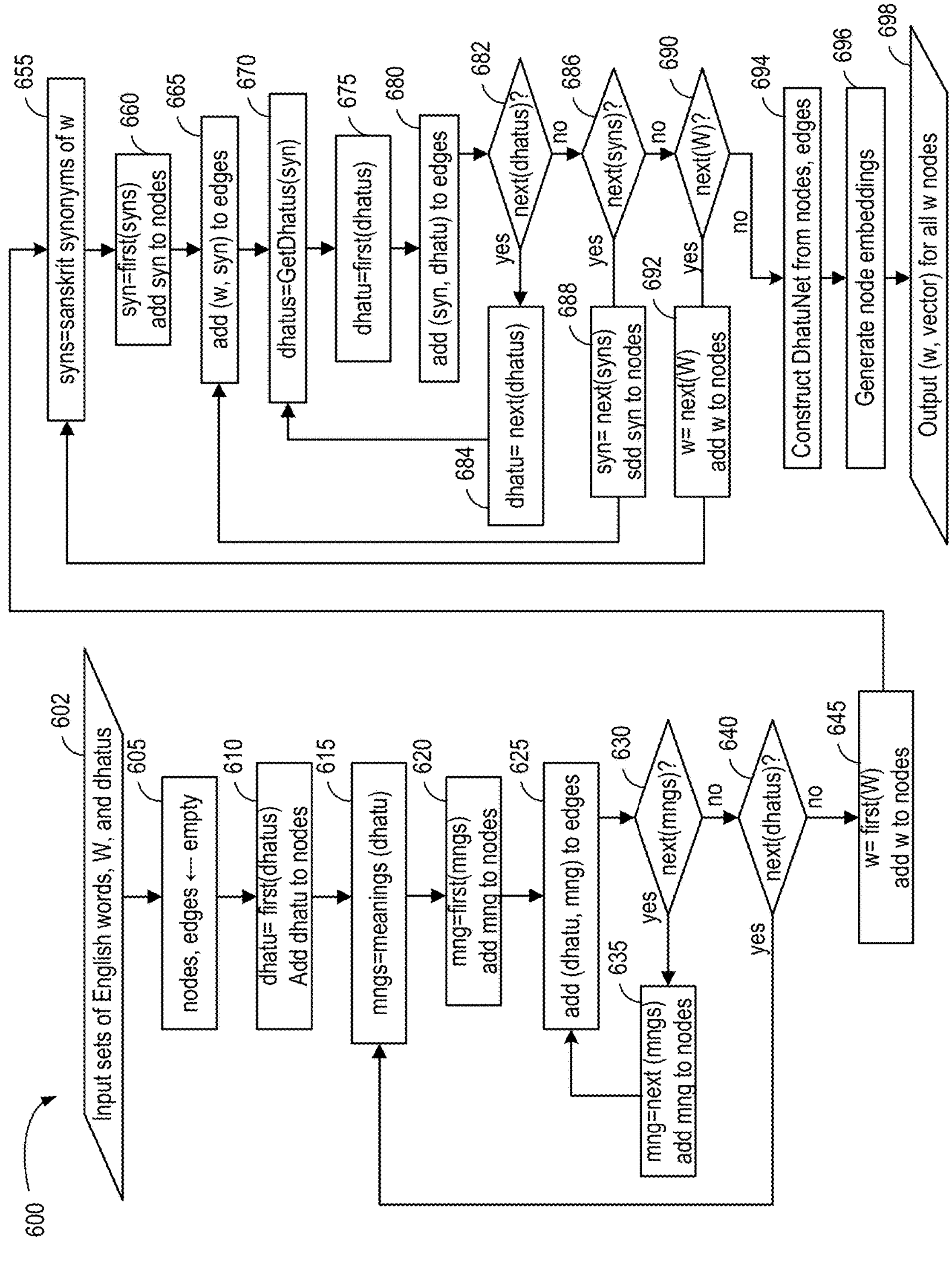
FIG. 6 is a flowchart 600 describing a method for building a DhatuNet graph for a given vocabulary of English words (W).

FIG. 6 is a flowchart 600 describing a method for building a DhatuNet graph for a given vocabulary of English words (W). Inputs are sets of English words W and Sanskrit dhatus (602). Initially, the nodes and edges of the graph are empty (605). The Dhatus (dhatus) of Sanskrit are added as nodes in the graph (610). A meaning or meanings are extracted for each dhatu (615). Nodes are created for the Dhatu-meanings (620) and edges are created from each Dhatu to its Dhatu-meaning nodes (625). Decision 630 and step 635 repeat step 625 until the meanings are exhausted. Decision 640 returns to step 615 until the dhatus are exhausted.

The first of the English words w is added as a node to the graph (645). The Sanskrit synonyms (syns) are identified for word w (655). Each Sanskrit synonym (syn) is, in turn, added as a node (660) and an edge is created between the English word w and the Sanskrit synonym syn (665). Next, in step 670, Dhatus for each synonym are obtained using e.g. the GetDhatus procedure illustrated in FIG. 2. Starting with the first Dhatu (675), an edge is created from the Sanskrit synonym node to the Dhatu node that is connected to the Dhatu-meaning node (680). This process is repeated for all Dhatus (decision 682 and step 684), all synonyms (decision 686 and step 688), and all English words w in W (decision 690 and step 692). A DhatuNet graph like graph 500 of FIG. 5, likely with a great many more nodes, is completed (694).

The next step is to map meaning nodes as vectors in an embedding space in which embeddings with similar contexts are mapped close to one another (696). Embeddings for meaning nodes can be generated using machine-learning algorithms like Node2Vec. Node2Vec generates a vector representation for each node in the DhatuNet (including English words, Sanskrit words, and dhatus) such that vectors of closely connected nodes will be more similar than those less closely connected. A vector-similarity check can then tell whether two words are similar. The embeddings are then output as a word vector (698) that can be used as an input to other machine learning models and algorithms. The word vector represents an English word w as a low-dimensional distributed embedding based on the Dhatu-meaning space. These embeddings can be combined with distributional embeddings to obtain a richer semantic representation for downstream NLP tasks.

Embeddings capture the semantic meaning and contextual information that machine learning models can leverage for (NLP) tasks. For example, word embeddings enable measuring semantic similarity between words by calculating the cosine similarity or Euclidean distance between their corresponding vectors. For example, the similarity between "cat" and "dog" would be higher than that between "cat" and "car." Moreover, word embeddings can be used to perform analogies like "king"–"queen"="man"–"woman" by finding the word vector that best represents the relationship. In text classification tasks, such as sentiment analysis or spam detection, word embeddings can be used to represent text documents. A model can average or concatenate the word vectors within a document to create a fixed-size representation, which is then fed into a classifier. Embeddings can further aid in recognizing entities like names, dates, and locations, and can help in machine translation to convert words between different languages. For example, applying the foregoing methods using French rather than English as the input language would yield embeddings that approximate meaning better than a direct French-to-English translation. Embeddings can also play a role in predicting the next word in a sequence based on context and previously generated words.

Unifying DhatuNet with Lexical Databases

The English-to-Sanskrit dictionary may not include the corresponding Sanskrit words for some of the English language words. In this case, the DhatuNet can be used with some general lexical databases like WordNet, which contains words and a small set of semantic relationships between words such as synonym or hypernym relations. The DhatuNet graph can be unified with such lexical database represented using graphs by merging the English word nodes in both the graphs. Embeddings can be generated for those English word nodes like the DhatuNet embeddings.

Consider a scenario that for a given English language word (w), the corresponding Sanskrit word is unavailable in the English-to-Sanskrit dictionary employed by the system. Hence, the word (w) is disconnected from the DhatuNet graph, which prevents from generating Dhatu-based embeddings for the word (w). However, by connecting to the lexical database, like WordNet, the English word (w) has a hypernym (or synonym, hyponym, and others) relation with another word (u), such that u has a corresponding Sanskrit word in the English-to-Sanskrit dictionary. This enables the word w to be connected to DhatuNet graph through the intermediate node u.

Semantic Language Interpretation Using Dhatu Vectors

In Language Morphology Based Lexical Semantics Extraction, the dimensions of Dhatu vectors are independent and meaningful since each dimension denotes a Dhatu meaning. This format facilitates the interpretation of the logical combinations of natural language words using the Dhatu vectors. Semantic language interpretation using Dhatu vectors defines the logical operations such as AND, OR, and NOT to compute the semantic similarities of words or combinations of words. The logical operators are interpreted using pointwise (element-wise) operations on the generated Dhatu vectors. The logical operators used in Semantic Language Interpretation can, in some embodiments, be defined using Dhatu vectors as follows.

$$DV(w1 \text{ OR } w2) = pointwise \text{ maximum}(DV(w1), DV(w2))$$

$$DV(w1 \text{ AND } w2) = pointwise \text{ minimum}(DV(w1), DV(w2))$$

$$DV(\text{NOT } w) = pointwise \text{ inverse}(DV(w))$$

where, DV denotes the Dhatu Vector, w1 denotes the first natural language word and w2 specifies the second natural language word.

The semantic language interpretation method can be applied to complex expressions that involve more than one logical operation among the natural language words. For example, the complex expression can be "fountain OR (park AND home)". The logical combination of DV(fountain OR (park AND home)) and DV(garden) are semantically similar.

Moreover, the common semantic property among the natural language words can be inferred from the semantic language interpretation using Dhatu vectors. The semantic characteristics of each word are identified from the Dhatus. The frequency count for each semantic characteristic is determined and represented using the Dhatu vectors. The common semantic properties are extracted using the logical AND operation on the Dhatu vectors. For example, the common semantic property "cold" can be extracted for the DV(snow) and DV(ice). In addition, this semantic interpretation can also be helpful during the tasks of natural language querying and understanding.

Dhatu Tensor

Figure 7:
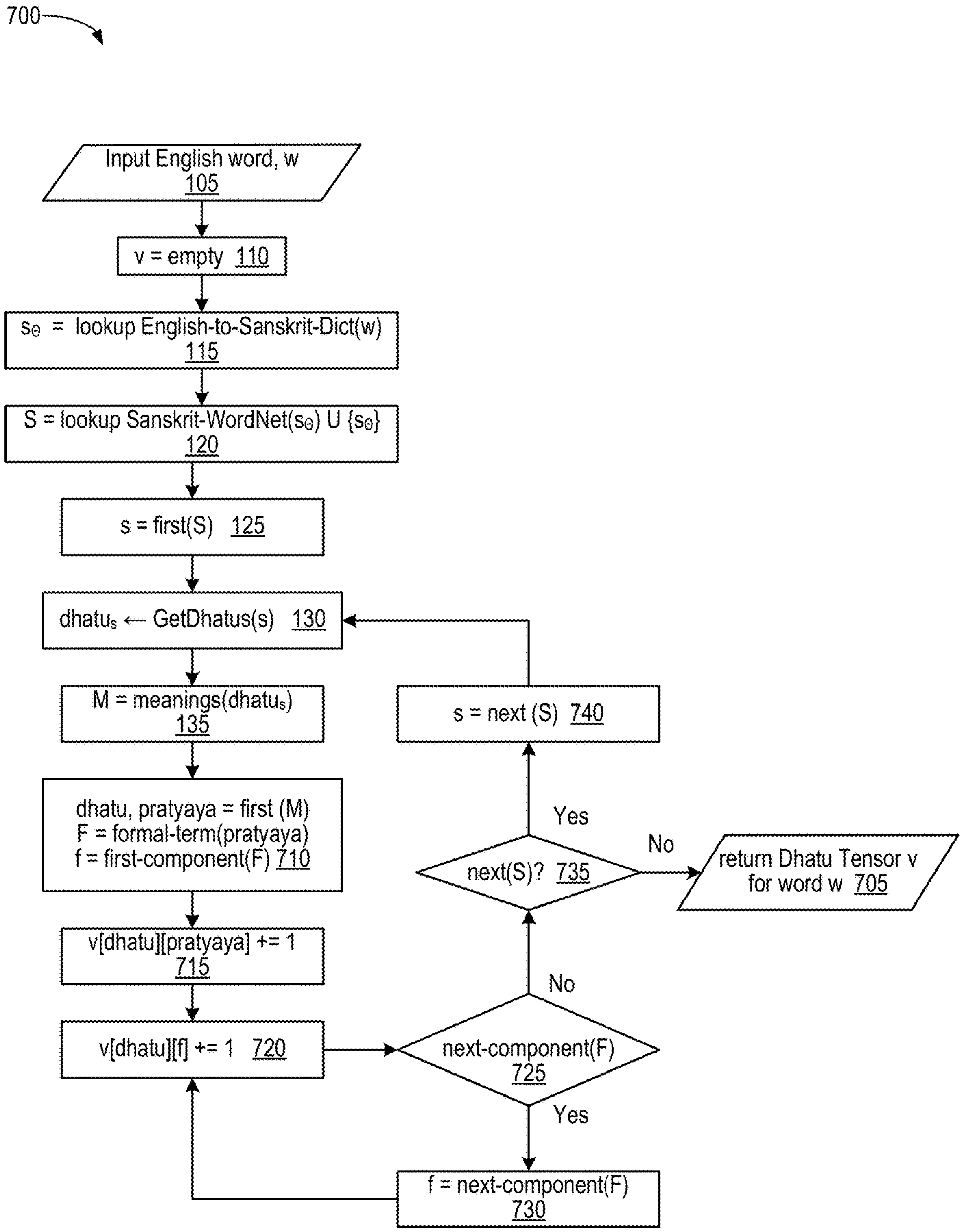
FIG. 7 is a flowchart 700 illustrating a process for capturing a semantic vector representation of an English word w (105) as a Dhatu Tensor 705.

FIG. 7 is a flowchart 700 illustrating a process for capturing a semantic vector representation of an English word w (105) as a Dhatu Tensor 705, the output at lower right. The central idea is that the union of the Dhatus and the corresponding Pratyayas for all the Sanskrit synonyms of an English word (w) captures the word's significant semantic attributes. Dhatu Tensor 705 is a 2-Dimensional tensor with Dhatus (or optionally, Dhatu-meanings) along one dimension and the Pratyayas (and any other semantic edge labels such as hypernymy) along the second dimension. The frequency of occurrence of Dhatu-Pratyaya combinations forms the set of values in Dhatu Tensor 705.

As in the example of FIG. 1, an English word w (105) is input and a two-dimensional tensor v, which will be populated to for Dhatu Tensor 705, is initialized to zero, or empty (step 110). An equivalent primary Sanskrit word (s0) is obtained for word w from an English-to-Sanskrit dictionary (115). A set of Sanskrit synonyms is collected for s0, with the union of s0 and its synonyms represented as a set of synonyms S (120). Starting with the first synonym s in set S (125), function GetDhatus(s) is called to deconstruct the synonym into one or more Dhatus (130). A set of meanings M is then extracted from Dhatus set dhatus (135).

The following Table 6 includes a sample list of Pratyayas and their formal semantic representations F. Each formal representation includes at least one component f. In the top row of Table 6, for example, the pratyaya="nich" has a formal representation (F) of nich=cause(agent(do(X))) with components (f) of "cause", "agent", and "do". Step 710 assigns variables: dhatu, pratyaya=first M extracts the Dhatu and associated Pratyaya from the first (or current) element of (M); F=formal-term (pratyaya) looks up the formal semantic representation (F) for the Pratyaya; and f=first-component (F) isolates the initial semantic component from (F). Steps 715 and 720 increment components of vector v. For example, consider dhatu="path" and pratyaya="nich", formal representation (F) of nich=cause(agent(do(X))), then (f) iterates through "cause", "agent", "do". This is because the Formal representation (F) of "nich": nich (X)=cause(agent (do(X)). Here we are composing a sequence of semantic functions: "cause", "agent", and "do". These are the semantic components of the formal representation (F) of the pratyaya here. So the loop in the flowchart 700 will iterate through these components with "f"="cause", "f"="agent", and "f"="do" in each iteration. Thus, v["path"]["nich"}+=1 (step 715) and v["path"]["cause"]+=1, v["path"]["agent"]+=1, v["path"]["do"]+=1 (in 720). Per decision 725 and step 730, step 720 repeats for each component f. Per decision 735 and step 740, the loop with steps 715 and 720 repeats for each synonym S to fully populate vector v. The completed vector v is then returned as Dhatu Tensor 705 for word w.

TABLE 6

A sample list of Pratyayas and their formal semantic representation.

| Pratyaya | Grammatic/Semantic Roles | Formal Semantic Representation (F) |
|---|---|---|
| nich | make someone do - | cause(agent(do(X))) |
| ktavat | Simple past | past(do(X)) |
| gani | abstract noun - object of - | object-of(X) |
| ach | abstract nouns/masculine | state(X) |
| shanach | Present continuous | present(do(X)) |

Figure 8:
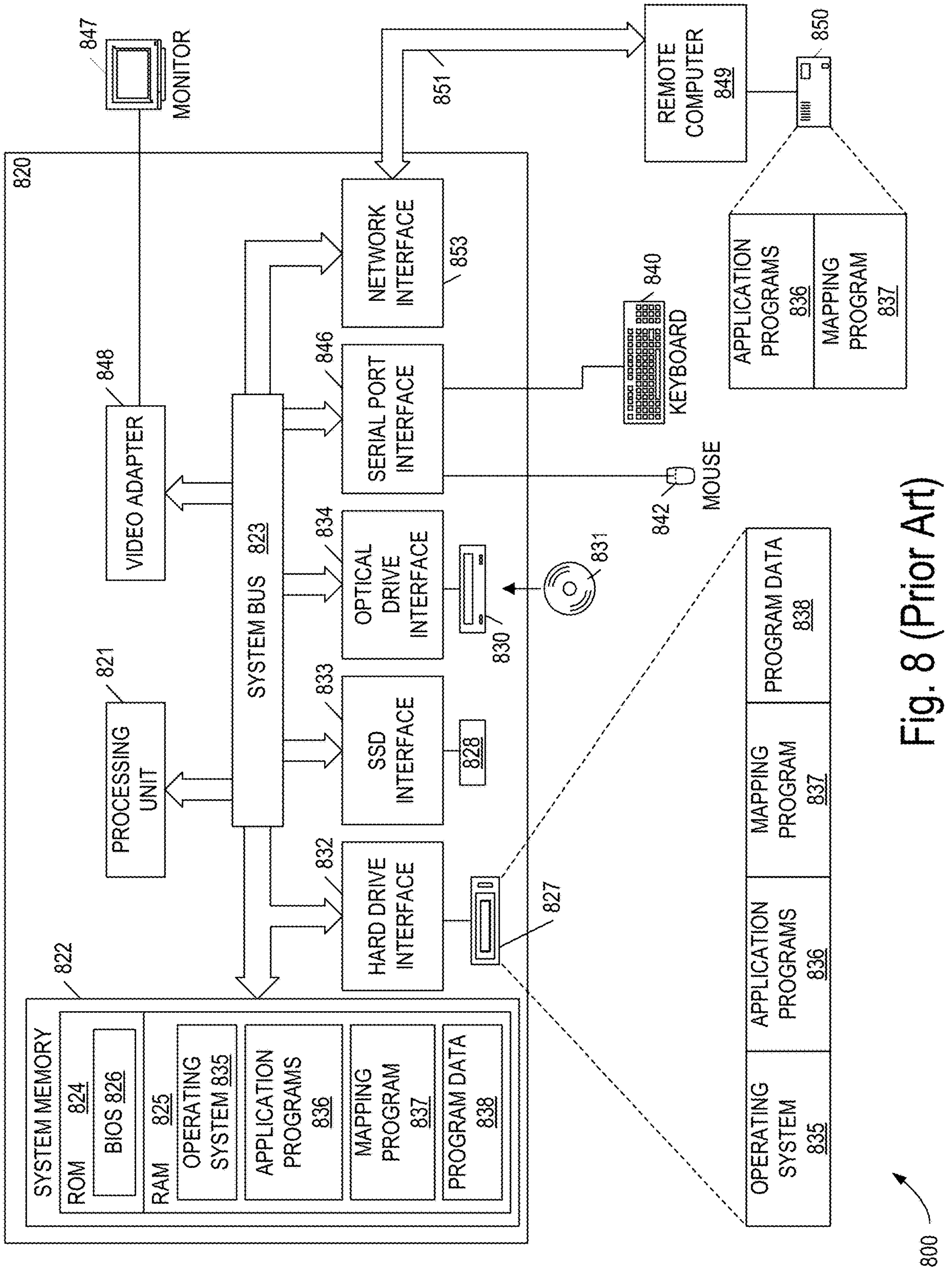
Fig. 8 (Prior Art)
FIG. 8 depicts a general-purpose computing system 800 that can serve as a client or a server depending on the program modules and components included.

FIG. 8 and the following discussion are intended to provide a brief, general description of a suitable computing environment in which the invention may be implemented. The foregoing examples are described in the general context of computer-executable instructions, such as program modules, executed on client and server computers linked through a communication network, including the Internet. Generally, program modules include routines, programs, objects, components, data structures, etc., that perform tasks or implement abstract data types. In a distributed computing environment, program modules may be in both local and remote memory storage devices and may be executed by client and server computers.

FIG. 8 depicts a general-purpose computing system 800 that can serve as a client or a server depending on the program modules and components included. One or more computers of the type depicted in computing system 800 can be configured to perform operations described with respect to FIGS. 1-6. In such a configuration, a non-transitory computer-readable medium, such as a solid-state drive, is loaded with program instructions that can be executed by a computing system or systems to perform the above-described methods. Those skilled in the art will appreciate that the invention may be practiced using other system configurations, including hand-held devices, multiprocessor systems, microprocessor-based or programmable consumer electronics, network PCs, minicomputers, mainframe computers, and the like.

Computing system 800 includes a conventional computer 820, including a processing unit 821, a system memory 822, and a system bus 823 that couples various system components including the system memory to the processing unit 821. The system bus 823 may be any of several types of bus structures, including a memory bus or memory controller, a peripheral bus, and a local bus using any of a variety of bus architectures. The system memory includes read only memory (ROM) 824 and random-access memory (RAM) 825. A basic input/output system 826 (BIOS), containing the basic routines that help to transfer information between elements within the computer 820, such as during start-up, is stored in ROM 824. The computer 820 further includes a hard disk drive 827 for reading from and writing to a hard disk, not shown, a solid-state drive (SSD) 828 (e.g. NAND flash memory), and an optical disk drive 830 for reading from or writing to an optical disk 831 (e.g., a CD or DVD). The hard disk drive 827, SSD 828, and optical disk drive 830 are connected to the system bus 823 by a hard disk drive interface 832, an SSD interface 833, and an optical drive interface 834, respectively. The drives and their associated computer-readable media provide nonvolatile storage of computer readable instructions, data structures, program modules and other data for computer 820. Other types of computer-readable media can be used.

Program modules may be stored on the hard disk, solid state disk 828, optical disk 831, ROM 824 or RAM 825, including an operating system 835, one or more application programs 836, other program modules 837, and program data 838. An application program 836 can use other elements that reside in system memory 822 to perform the processes detailed above in connection with FIG. 1-6.

A user may enter commands and information into the computer 820 through input devices such as a keyboard 840 and pointing device 842. Other input devices (not shown) may include a microphone, joystick, game pad, satellite dish, scanner, or the like. These and other input devices are often connected to the processing unit 821 through a serial port interface 846 that is coupled to the system bus, but may be connected by other interfaces, such as a parallel port, game port, universal serial bus (USB), or various wireless options. A monitor 847 or other type of display device is also connected to the system bus 823 via an interface, such as a video adapter 848. In addition to the monitor, computers can include or be connected to other peripheral devices (not shown), such as speakers and printers.

The computer 820 may operate in a networked environment using logical connections to one or more remote computers, such as a remote computer 849. The remote computer 849 may be another computer, a server, a router, a network PC, a peer device, or other common network node, and typically includes many or all the elements described above relative to the computer 820, although only a memory storage device 850 has been illustrated in FIG. 8 to show support for e.g. the databases noted above in connection with FIGS. 1-6. The logical connections depicted in FIG. 8 include a network connection 851, which can support a local area network (LAN) and/or a wide area network (WAN). Such networking environments are commonplace in offices, enterprise-wide computer networks, intranets, and the Internet.

Computer 820 includes a network interface 853 to communicate with remote computer 849 via network connection 851. In a networked environment, program modules depicted relative to the computer 820, or portions thereof, may be stored in the remote memory storage device. It will be appreciated that the network connections shown are exemplary and other means of establishing a communication link between the computers may be used.

In the foregoing description and in the accompanying drawings, specific terminology and drawing symbols are set forth to provide a thorough understanding of the present invention. In some instances, the terminology and symbols may imply specific details that are not required to practice the invention. Variations of these embodiments, including embodiments in which features are used separately or in any combination, will be obvious to those of ordinary skill in the art. Therefore, the spirit and scope of the appended claims should not be limited to the foregoing description. In U.S. applications, only those claims specifically reciting "means for" or "step for" should be construed in the manner required under 35 U.S.C. section 112(f).

What is claimed is:

1. A method for finding at least one meaning of a word in a first language using a second language, the method comprising:

receiving the word in the first language;

retrieving a list of synonyms of the word in the second language;

mapping the synonyms into morphological units of the second language by, for each of the synonyms:

extracting a set of character spans from the synonym;

matching each character span against a list of word roots of the second language to find span matches;

scoring the span matches;

selecting high-scoring ones of the span matches as the morphological units; and deriving the at least one meaning of the word in the first language from the morphological units of the second language.

2. The method of claim 1, wherein the morphological units of the second language comprise Dhatus.

3. The method of claim 2, wherein the morphological units are the Dhatus.

4. The method of claim 1, wherein the first language is English.

5. The method of claim 4, wherein the second language is Sanskrit.

6. The method of claim 1, wherein the deriving comprises representing a union of the morphological units as a vector.

7. The method of claim 6, wherein the morphological units are of a number N and the vector is N-dimensional.

8. The method of claim 1, wherein mapping the synonyms into the morphological units comprises applying inverse morphological rules to the synonyms and the morphological rules comprise Pratyayas.

9. The method of claim 1, wherein the morphological units are a subset of a set of morphological units, and wherein mapping the synonyms into the morphological units comprises grouping each synonym into character spans and comparing each character span with the set of morphological units.

10. The method of claim 1, further comprising representing the meaning of the word as a vector.

11. The method of claim 10, further comprising inputting the vector as an embedding to a machine-learning model.

12. The method of claim 1, wherein the word is a second of two synonyms in the first language, the method further comprising:

receiving the first of the two synonyms in the first language, the first of the two synonyms in the first language lacking synonyms in the second language; and retrieving a list of synonyms in the first language, the list of synonyms in the first language including the second of the two synonyms.

13. A non-transitory computer-readable medium comprising program instructions, wherein when the program instructions are executed by a computer, the computer is configured to perform a method for finding at least one meaning of a word in a first language using a second language, the method comprising:

receiving the word in the first language;

retrieving a list of synonyms of the word in the second language;

mapping the synonyms into morphological units of the second language by, for each of the synonyms:

extracting a set of character spans from the synonym;

matching each character span against a list of word roots of the second language to find span matches;

scoring the span matches;

selecting high-scoring ones of the span matches as the morphological units;

and deriving the meaning of the word in the first language from the morphological units of the second language.

14. The non-transitory computer-readable medium of claim 13, wherein the second language comprises Dhatus.

15. The non-transitory computer-readable medium of claim 14, wherein the morphological units are the Dhatus.

16. The non-transitory computer-readable medium of claim 13, wherein the deriving comprises representing a union of the morphological units as a vector.

* * * * *